US007546088B2

(12) United States Patent
Kroeger et al.

(10) Patent No.: US 7,546,088 B2
(45) Date of Patent: Jun. 9, 2009

(54) METHOD AND APPARATUS FOR BLENDING AN AUDIO SIGNAL IN AN IN-BAND ON-CHANNEL RADIO SYSTEM

(75) Inventors: Brian W. Kroeger, Sykesville, MD (US); Marek Milbar, Huntingdon Valley, PA (US)

(73) Assignee: iBiquity Digital Corporation, Columbia, MD (US)

( * ) Notice: Subject to any disclaimer, the term of this patent is extended or adjusted under 35 U.S.C. 154(b) by 674 days.

(21) Appl. No.: 10/898,829

(22) Filed: Jul. 26, 2004

(65) Prior Publication Data

US 2006/0019601 A1 Jan. 26, 2006

(51) Int. Cl.
*H04B 1/00* (2006.01)

(52) U.S. Cl. ......................... 455/60; 455/130; 455/133; 455/135; 375/340; 375/346; 375/322

(58) Field of Classification Search ............... 455/3.01, 455/3.02, 3.03, 73, 130, 60, 133, 135; 375/316, 375/340, 346, 322, 324
See application file for complete search history.

(56) References Cited

U.S. PATENT DOCUMENTS 6,111,992 A * 8/2000 Likhterov et al. ........... 382/260
6,178,317 B1 1/2001 Kroeger et al.
6,430,401 B1 * 8/2002 Lou et al. .................. 455/108
6,539,065 B1 * 3/2003 Furukawa .................. 375/316
6,590,944 B1 * 7/2003 Kroeger ...................... 375/340
6,735,257 B2 5/2004 Kroeger
2004/0022231 A1 2/2004 Morrish et al.
2004/0043730 A1 * 3/2004 Schill et al. ................. 455/130
2004/0105505 A1 6/2004 Kitamura
2004/0189540 A1 * 9/2004 Schadler ..................... 343/890
2004/0192191 A1 * 9/2004 Toporski et al. ............ 455/3.06
2004/0261132 A1 * 12/2004 Shimizu ..................... 725/139
2005/0003772 A1 * 1/2005 Nemoto ...................... 455/130

FOREIGN PATENT DOCUMENTS

JP 1292130 A2 * 12/2003

* cited by examiner

*Primary Examiner*—Tuan A Pham
(74) *Attorney, Agent, or Firm*—Robert P. Lenart, Esq.; Pietragallo Gordon Alfano Bosick & Raspanti, LLP

(57) ABSTRACT

A method for processing a composite digital audio broadcast signal to mitigate intermittent interruptions in the reception of the digital audio broadcast signal, the method comprising the steps of separating an analog audio portion of the digital audio broadcast signal from a digital audio portion of the digital audio broadcast signal, detecting errors in the digital audio portion of the digital audio broadcast signal, adjusting the digital audio portion of the digital audio broadcast signal in response to errors in the digital audio portion of the digital audio broadcast signal to produce an adjusted digital audio portion, and blending the analog audio portion with the adjusted digital audio portion to produce an audio output. A receiver that performs the method is also included.

29 Claims, 8 Drawing Sheets

STEREO/MONO BLEND AND CONTROL

METHOD AND APPARATUS FOR BLENDING AN AUDIO SIGNAL IN AN IN-BAND ON-CHANNEL RADIO SYSTEM

FIELD OF THE INVENTION

This invention relates to signal processing in radio receivers, and more particularly to methods and apparatus for blending digital and analog components of the audio signal in an In-Band On-Channel radio system.

BACKGROUND OF THE INVENTION

Both AM and FM In-Band On-Channel (IBOC) broadcasting systems utilize a composite signal including an analog modulated carrier and a plurality of digitally modulated subcarriers. The audio signal can be redundantly transmitted on the analog modulate carrier and the digitally modulated subcarriers. The analog audio is delayed at the transmitter by the diversity delay.

In the absence of the digital audio signal (for example, when the channel is initially tuned) the analog AM or FM backup audio signal is fed to the audio output. When the digital audio signal becomes available, a blend function smoothly attenuates and eventually replaces the analog backup signal with the digital audio signal while blending in the digital audio signal such that the transition preserves some continuity of the audio program. Similar blending occurs during channel outages which corrupt the digital signal. In this case the analog signal is gradually blended into the output audio signal by attenuating the digital signal such that the audio is fully blended to analog when the digital corruption appears at the audio output. Corruption of the digital audio signal can be detected during the diversity delay time through cyclic redundancy check (CRC) error detection means, or other digital detection means in the audio decoder or receiver.

The digital signal has characteristics such that the digital audio is either virtually perfect or not received at all, whereas the analog signal generally experiences a degraded quality as the signal quality (e.g. signal to noise ratio (SNR)) degrades. Therefore the analog signal is a good backup when the digital signal is lost. Furthermore it is required that the receiver output the analog audio signal whenever the digital signal is not present.

The concept of blending between the digital audio signal of an IBOC system and the analog audio signal has been previously described in U.S. Pat. Nos. 6,178,317; 6,590,944; and 6,735,257, the disclosures of which are hereby incorporated by reference. The diversity delay and blend allow the receiver to fill in the digital audio gaps with analog audio when digital outages occur. The diversity delay ensures that the audio output has a reasonable quality when brief outages occur in a mobile environment (for example, when a mobile receiver passes under a bridge). This is because the time diversity causes the outages to affect different segments of the audio program for the digital and analog signals.

Both FM and AM Hybrid In-Band On-Channel (IBOC) HD Radio™ receivers require an audio blend function for the purposes of blending to the FM or AM analog backup signal when the digital signal is unavailable. The maximum blend transition time is limited by the diversity delay and receiver decoding times, and is typically less than one second. Frequent blends can sometimes degrade the listening experience when the audio differences between the digital and analog are significant.

This invention provides a method and apparatus for processing the digital audio during these frequent blend occurrences to make the blending less annoying to the listener.

SUMMARY OF THE INVENTION

This invention provides a method for processing a composite digital audio broadcast signal to mitigate intermittent interruptions in the reception of the digital audio broadcast signal. The method comprises the steps of separating an analog audio portion of the digital audio broadcast signal from a digital audio portion of the digital audio broadcast signal, detecting errors in the digital audio portion of the digital audio broadcast signal, adjusting either stereo separation or bandwidth or both of the digital audio portion of the digital audio broadcast signal in response to errors in the digital audio portion of the digital audio broadcast signal to produce an adjusted digital audio portion, and blending the analog audio portion with the adjusted digital audio portion to produce an audio output.

In another aspect, the invention provides a method for processing a composite digital audio broadcast signal to mitigate intermittent interruptions in the reception of the digital audio broadcast signal, wherein the method comprising the steps of separating an analog audio portion of the digital audio broadcast signal from a digital audio portion of the digital audio broadcast signal, detecting errors in the digital audio portion of the digital audio broadcast signal, adjusting the digital audio portion of the digital audio broadcast signal in response to errors in the digital audio portion of the digital audio broadcast signal to produce an adjusted digital audio portion, and blending the analog audio portion with the adjusted digital audio portion produce an audio output. The step of adjusting either stereo separation or bandwidth or both of the digital audio portion of the digital audio broadcast signal can comprise at least one of the steps of setting the digital audio portion to monaural, adding noise to the digital audio portion, and attenuating the digital audio portion.

The invention also encompasses a method for processing a composite digital audio broadcast signal, wherein the method comprising the steps of separating an analog audio portion of the digital audio broadcast signal from a digital audio portion of the digital audio broadcast signal, detecting errors in the digital audio portion of the digital audio broadcast signal, and producing an audible and/or visible indication of degradation in the digital audio portion of the digital audio broadcast signal.

In another aspect, the invention provides a radio receiver comprising an input for receiving a composite digital audio broadcast signal including an analog audio portion and a digital audio portion, a filter for separating the analog audio portion of the digital audio broadcast signal from the digital audio portion of the digital audio broadcast signal, and a processor for detecting errors in the digital audio portion of the digital audio broadcast signal, adjusting either stereo separation or bandwidth or both of the digital audio portion of the digital audio broadcast signal in response to errors in the digital audio portion of the digital audio broadcast signal to produce an adjusted digital audio portion, and blending the analog audio portion with the adjusted digital audio portion to produce an audio output.

The invention further encompasses a radio receiver comprising an input for receiving a composite digital audio broadcast signal including an analog audio portion and a digital audio portion, a filter for separating the analog audio portion of the digital audio broadcast signal from the digital audio portion of the digital audio broadcast signal, and a processor for detecting errors in the digital audio portion of the digital audio broadcast signal, for adjusting the digital audio portion of the digital audio broadcast signal in response to errors in the digital audio portion of the digital audio broadcast signal to produce an adjusted digital audio portion, and for blending the analog audio portion with the adjusted digital audio portion to produce an audio output. The processor can perform at least one of the steps of setting the digital audio portion to monaural, adding noise to the digital audio portion, and attenuating the digital audio portion.

The invention also encompasses a radio receiver comprising an input for receiving a composite digital audio broadcast signal including an analog audio portion and a digital audio portion, a filter for separating the analog audio portion of the digital audio broadcast signal from the digital audio portion of the digital audio broadcast signal, and a processor for detecting errors in the digital audio portion of the digital audio broadcast signal, and for producing an audible and/or visible indication of degradation in the digital audio portion of the digital audio broadcast signal.

DETAILED DESCRIPTION OF THE INVENTION

Figure 1:
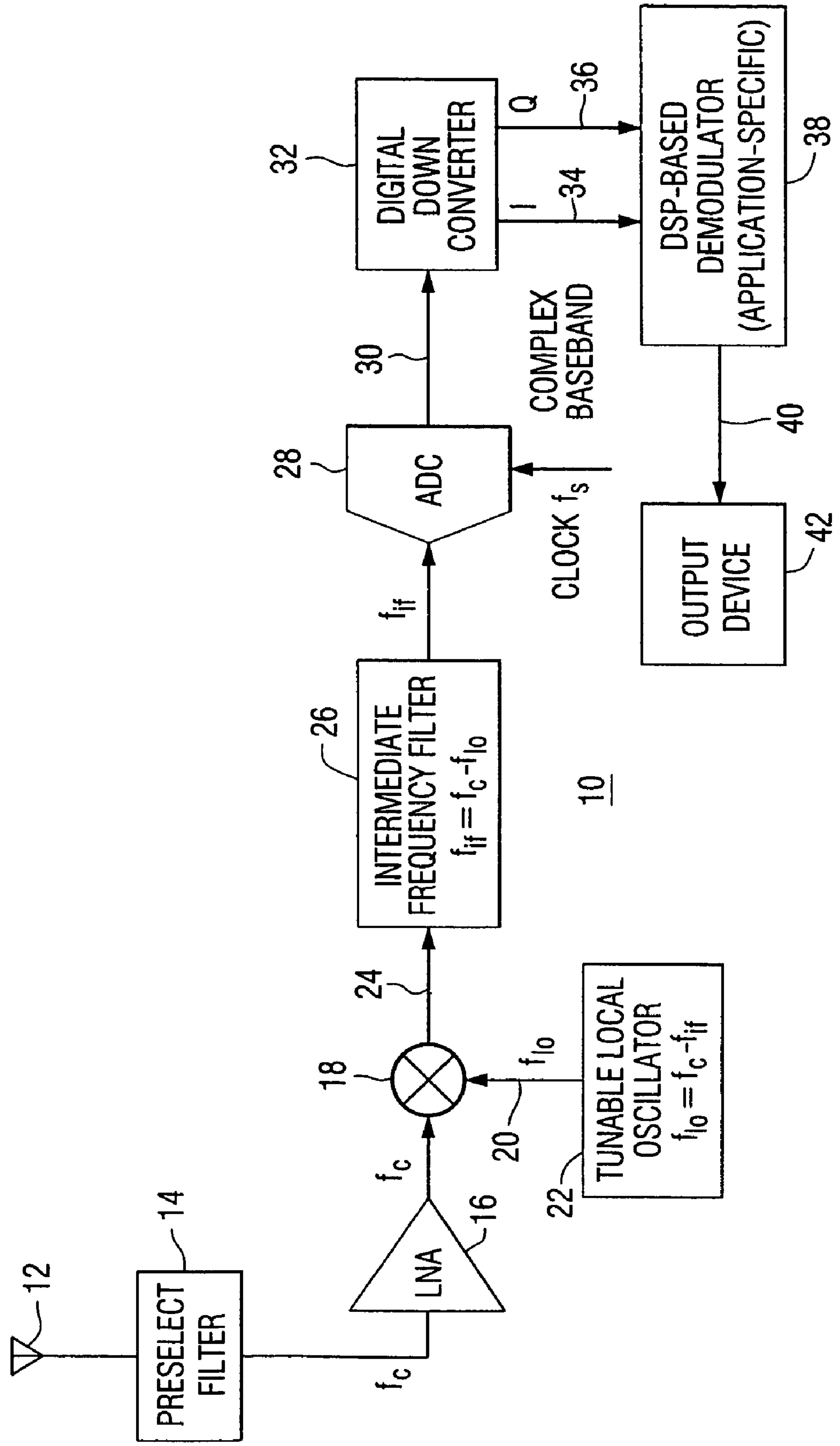
FIG. 1 is a block diagram of a radio receiver capable of blending analog and digital portions of a digital broadcasting signal in accordance with the present invention.

Referring to the drawings, FIG. 1 is a block diagram of a radio receiver 10 constructed in accordance with this invention. The composite IBOC digital audio broadcasting (DAB) signal is received on antenna 12. A bandpass preselect filter 14 passes the frequency band of interest, including the desired signal at frequency $f_c$, but rejects the image signal at $f_c-2f_{if}$ (for a low side lobe injection local oscillator). Low noise amplifier 16 amplifies the signal. The amplified signal is mixed in mixer 18 with a local oscillator signal $f_{lo}$ supplied on line 20 by a tunable local oscillator 22. This creates sum ($f_c+f_{lo}$) and difference ($f_c-f_{lo}$) signals on line 24. Intermediate frequency filter 26 passes the intermediate frequency signal $f_{if}$ and attenuates frequencies outside of the bandwidth of the signal of interest. An analog-to-digital converter 28 operates using a clock signal $f_s$ to produce digital samples on line 30 at a rate $f_s$. Digital down converter 32 frequency shifts, filters and decimates the signal to produce lower sample rate in-phase and quadrature signals on lines 34 and 36. A digital signal processor based demodulator 38 then provides additional signal processing to produce an output signal on line 40 for output device 42.

In the absence of the digital portion of the IBOC DAB audio signal (for example, when the channel is initially tuned), the analog AM or FM backup audio signal is fed to the audio output. When the digital portion of the IBOC DAB signal becomes available, the digital signal processor based demodulator implements a blend function to smoothly attenuate and eventually remove the analog backup signal while blending in the IBOC DAB audio signal such that the transition is minimally noticeable.

Similar blending occurs during channel outages which corrupt the digital portion of the IBOC DAB signal. In this case the analog signal is gradually blended into the output audio signal while attenuating the digital portion of the IBOC DAB signal such that the audio is fully blended to analog when the digital portion of the IBOC DAB is corrupted. The corruption can be detected during the diversity delay time through cyclic redundancy checking (CRC) error detection means or other appropriate means such as FEC or audio frame consistency.

Figure 2:
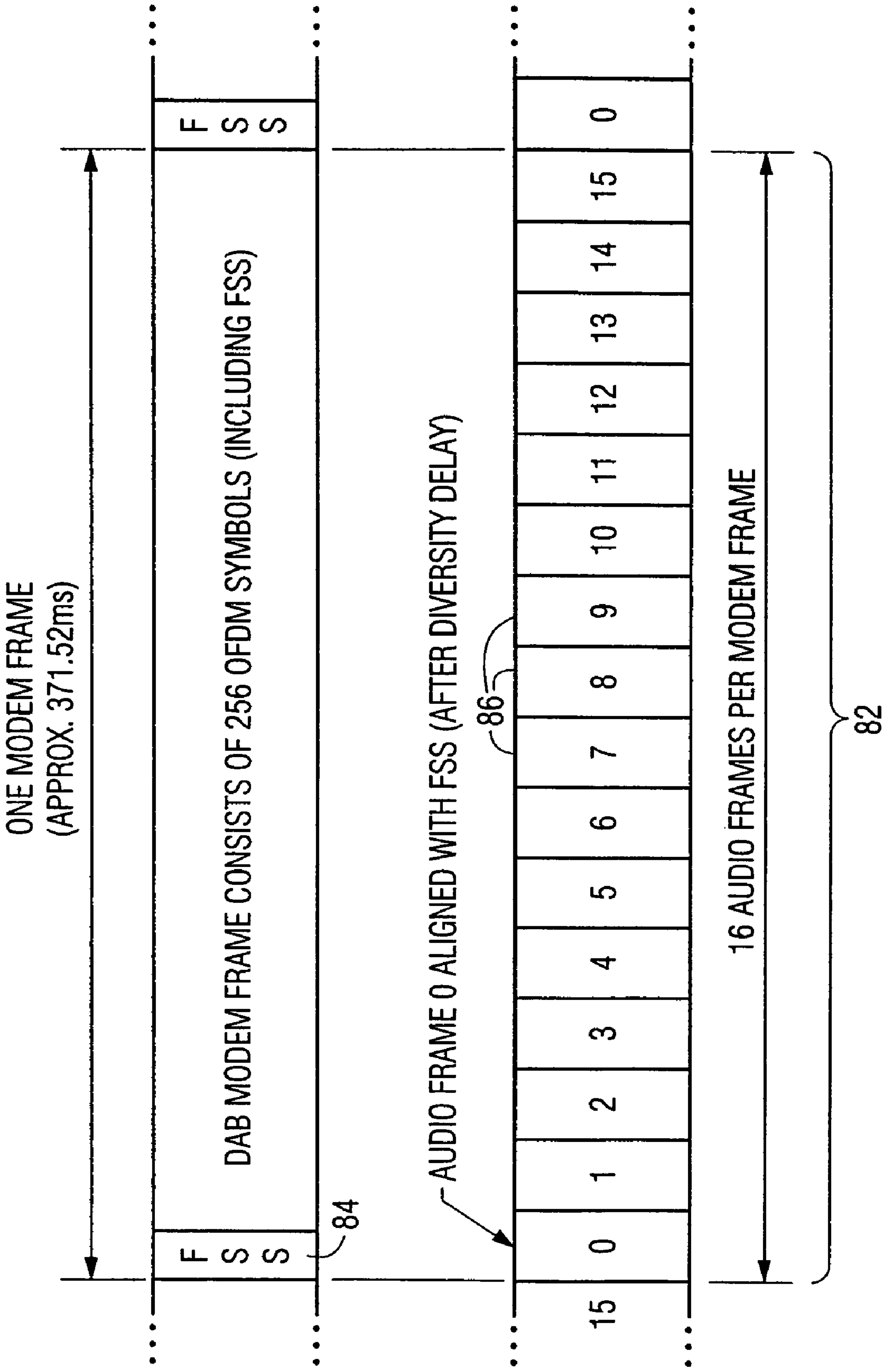
FIG. 2 is a timing diagram showing audio frame alignment with a frame start signal (FSS).

The digital information in the IBOC DAB composite signal is arranged into successive modem frames 82 as illustrated in FIG. 2. A Frame Start Symbol (FSS) 84 is transmitted at the start of each modem frame, occurring for example, every 256 OFDM symbols. The FSS indicates the alignment between the analog and digital signals. The modem frame contains symbols from 16 audio frames 86 (over a period of about 371.52 milliseconds). The leading edge of the FSS is aligned with the leading edge of audio frame 0 (modulo 16). The encoded data frame which holds the equivalent compressed information for the audio frame 0 is actually transmitted prior to the modem frame by a time period equal to the diversity delay. The equivalent leading edge is defined as the time sample of the analog (FM) signal that corresponds to the first sample of the FSS, or start of the modem frame. For convenience, the diversity delay is a defined integer multiple of modem frames. The diversity delay is significantly greater than the processing delays introduced by digital processing in a IBOC DAB transmitter, the delay being greater than 2.0 seconds, and preferably within a 3.0-5.0 second range.

Figure 3:
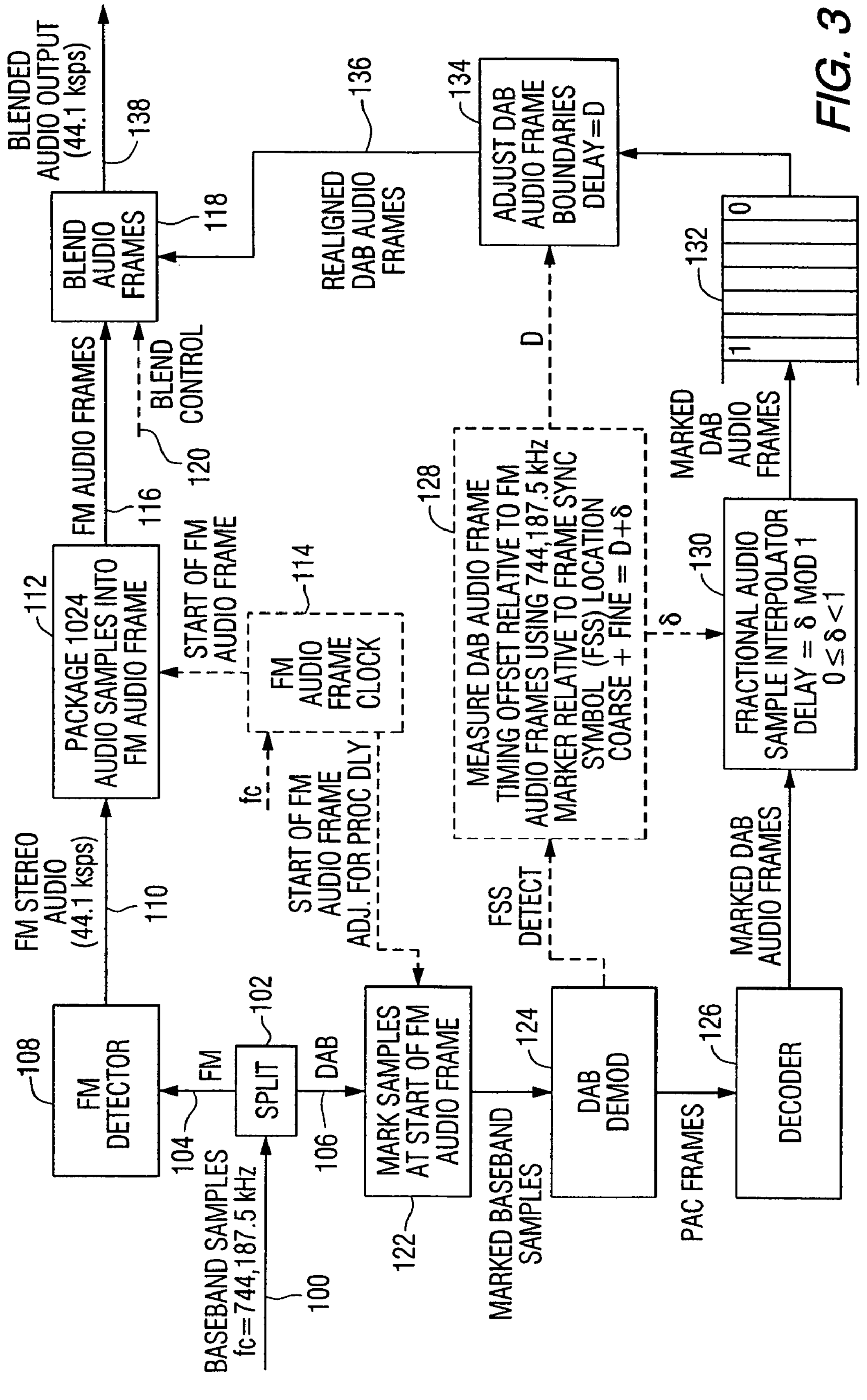
FIG. 3 is a functional block diagram of one blend implementation for FM Hybrid IBOC receivers.

FIG. 3 illustrates an example of a previously existing implementation of a blending system. The analog backup signal is detected and demodulated producing a 44.1 kHz audio sample stream (stereo in the case of FM, which can further blend to mono or mute under low signal-to-noise ratio (SNR) conditions). The digital audio decoder also generates audio samples at 44.1 kHz. However, these samples are synchronous with the modem data stream which is based upon the transmitter's reference clock. Minute differences in the 44.1 kHz clocks between the transmitter and receiver prevent direct one-to-one blending of the analog signal samples since the audio content would eventually drift apart over time. Therefore some method of realigning the analog and digital audio samples is required.

The analog and digital audio samples can be aligned through sample interpolation (resampling) of one of the audio streams such that it is synchronous with the other. If the local receiver 44.1 kHz clock is to be used for audio D/A output, then it is most convenient to resample the digital audio stream for blending into the analog audio stream, which is already synchronous to the receiver's local clock. This is accomplished in the blend technique shown in the functional block diagram of FIG. 3. The blend implementation of FIG. 3 is intended to be compatible with non-real-time processing of the signal samples. For instance, any delays are implemented by counting signal samples instead of measuring absolute time or periodic clock counts. This involves "marking" signal samples where alignment is required. Therefore the implementation is amenable to loosely coupled DSP subroutines where bulk transfer and processing of signal samples is acceptable. The only restrictions then are absolute end-to-end processing delay requirements along with appropriate signal sample marking to eliminate ambiguity over the processing time window.

FIG. 3 is a functional block diagram of the relevant portion of an FM Hybrid IBOC DAB receiver. An AM Hybrid IBOC DAB receiver would include nearly identical functionality. To facilitate the description of the invention in FIG. 3, program signal paths are shown as solid lines, while control signal paths are shown in broken lines. The signal input to the blend function on line 100 is the complex baseband modem signal (sampled at 744,187.5 kHz for FM in the preferred embodiment). Block 102 illustrates that this signal is split into an analog FM signal path 104 and a digital signal path 106. This can be accomplished by using filters to separate the signals. The analog FM signal path is processed by an FM detector 108 producing a stereo audio output sequence sampled at 44.1 kHz on line 110. This FM stereo signal may also have its own blend-to-mono algorithm similar to that already used in car radios to improve SNR at the expense of stereo separation. For convenience, as shown in block 112, the FM stereo sequence is framed into FM audio frames of 1024 audio stereo samples using the FM audio frame clock 114. These frames can then be transferred and processed in blocks. The FM audio frames on line 116 are then blended in block 118 with the realigned digital audio frames, when available. A blend control signal is input on line 120 to control the audio frame blending. The blend control signal controls the relative amounts of the analog and digital portions of the signal that are used to form the output. Typically the blend control signal is responsive to some measurement of degradation of the digital portion of the signal. One technique used to generate the blend control signal is described in the previously mentioned U. S. Pat. No. 6,178,317.

The baseband input signal is also split into the digital path 106 through its own filters to separate it from the analog FM signal. Block 122 shows that the DAB baseband signal is "marked" with the FM audio frame alignment after appropriate adjustment for different processing delay due to the splitter filters. This marking enables a subsequent alignment measurement such that the digital audio frames can be realigned to the FM audio frames. The digital signal demodulator 124 outputs the compressed and encoded data frames to the decoder 126 for subsequent conversion into digital signal audio frames. The digital signal demodulator is also assumed to include modem signal detection, synchronization, and any forward error correction (FEC) decoding needed to provided decoded and framed bits at its output. In addition, the digital signal demodulator detects the frame synchronization symbol (FSS) and measures the time delay relative to the marked baseband samples aligned with the FM audio frames. This measured time delay, as illustrated by block 128, reveals the digital signal audio frame offset time relative to the analog FM audio frame time with the resolution of the 744,187.5 kHz samples (i.e. resolution of ±672 nsec over an audio frame period). However, there remains an ambiguity regarding which audio frame is aligned (i.e. 0 through 15). This ambiguity is conveniently resolved by tagging each digital signal audio frame with a sequence number 0 through 15 modulo 16 over a modem frame period. For practical reasons, it is recommended that the sequence number be identified using a much larger modulus (e.g. an 8-bit sequence number tags digital signal audio frames 0 through 255) to allow processing time "slop" while still preventing ambiguity in modem frame alignment over the diversity delay.

The audio frame ambiguity resolution discussed in the previous paragraph can also be simplified by encoding an exact number of audio frames per modem frame. This requires a modification in the audio encoder such that variable length audio frames are not permitted to straddle modem frame boundaries. This simplification can eliminate the need for the sequence tagging of audio frames since these frames (e.g. 16, 32, or 64 audio frames) would appear in a known fixed sequence within each modem frame.

After the alignment error is measured and known, this error is removed by realigning the digital signal audio frames by exactly this amount. This is accomplished in two steps. The first realignment step removes the fractional sample misalignment error δ using the fractional audio sample interpolator 130. In effect the fractional audio sample interpolator simply resamples the digital signal audio samples with a delay δ. The next step in the realignment removes the integer portion of the sample delay error. This is accomplished by passing the fractionally realigned audio samples into a first-in first-out (FIFO) buffer 132. After these samples are read out of the FIFO buffer, they are readjusted as illustrated by block 134 such that the realigned digital signal audio frames are synchronous with the FM audio frames. The FIFO buffer introduces a significant delay which includes the diversity delay minus the delay incurred by the encoder. The realigned digital signal audio frames on line 136 are then blended with the FM audio frames on line 116 to produce a blended audio output on line 138.

Although the frame ambiguity can be resolved only at modem frame boundaries, the fractional audio sample portion (δ) of the timing offset of the FSS relative to the marked digital signal baseband sample should be measured at the start of each FM audio frame. This allows smoothing of the fractional interpolation delay value δ in order to minimize resample timing jitter. The dynamic change in the error value δ over time is proportional to the local clock error. For example, if the local clock error is 10 ppm relative to the IBOC DAB transmitter clock, then the fractional sample error δ will change by a whole audio sample approximately every 2.3 seconds. Similarly the change in δ over one modem frame time is about one sixth of an audio sample. This step size may be too large for high quality audio. Therefore the smoothing of δ is desirable to minimize this timing jitter.

This particular blend implementation allows the demodulator, the decoder, and fractional sample interpolator to operate without stringent timing constraints, as long as these processes are completed within the diversity delay time such that the digital signal audio frames are available at the appropriate blend times.

The audio blend function of this invention incorporates the diversity delay required of all the IBOC DAB systems. The preferred embodiment includes an audio sample rate alignment with a 44.1 kHz clock derived from the receiver's local clock source. The particular implementation described here involves the use of programmable digital signal processors (DSPs) operating in non-real-time as opposed to real-time hardware implementation. The alignment must accommodate a virtual 44.1 kHz lock which is synchronous with the transmitted digital signal. Although the transmitter and local receiver clocks are nominally designed for 44.1 kHz audio sample rate, physical clock tolerances result in an error which must be accommodated at the receiver. The method of alignment involves the interpolation (resampling) of the DAB audio signal to accommodate this clock error.

While the description of the previously existing blend technique illustrated in FIG. 3 uses a 1024 sample audio frame used in a particular audio compression codec, it should be recognized that the technique could be applied to 2048 sample audio frames used in other codecs.

One problem with the previous method of blending occurs as a result of the relatively short blend transition time. The transition time between the analog and digital audio outputs is generally less than one second, which is limited by the diversity delay and receiver decoding times. It has been observed that frequent transitions between the analog and digital audio can be somewhat annoying when the audio quality between the digital audio and the analog audio is significant. This is especially significant when the digital signal has a wider audio bandwidth than the analog audio, and the digital signal is stereo while the analog is mono. This phenomenon can occur in mobile receivers in fringe coverage areas when highway overpasses (or power lines for AM) are frequently encountered.

One method of dealing with this situation would be to control the blend function to prevent short bursts of digital audio while maintaining the analog signal output. Although this reduces the frequency of blend transitions, the analog audio is somewhat degraded and the potential advantages of the diversity delay are not exploited. In these cases the audio output experiences short segments of reduced audio quality where the digital signal could have actually filled these gaps with good audio, because the digital audio is suppressed to avoid the audio quality changes during the transitions.

If the bandwidth and stereo separation of the digital signal can be controlled during these events such that the digital audio is better matched to the analog audio in bandwidth and stereo separation, then the annoying transitions can be mitigated while filling in the degraded analog with a better digital audio signal.

Figure 4:
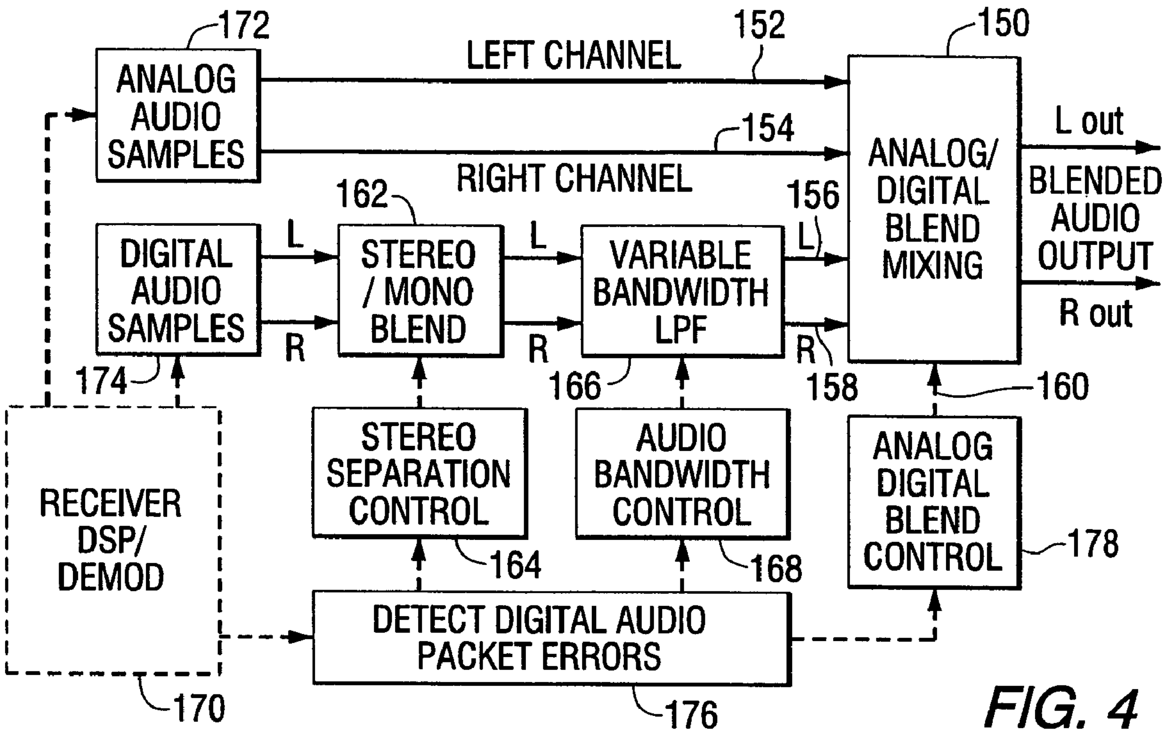
FIG. 4 is a functional block diagram of a smoothed blend function.

In one aspect, the present invention provides a method for processing the digital signal (bandwidth and stereo separation) during the frequent blend occurrences to achieve the additional transition smoothing. The additional functionality used to perform the method is illustrated in the functional diagram of FIG. 4. The function illustrated in FIG. 4 focuses on details surrounding the "Blend Audio Frames" block of FIG. 3. In FIG. 4 the blend function is more explicitly labeled as "ANALOG/DIGITAL BLEND MIXING" 150. Block 150 mixes (adds) the analog and digital audio samples on lines 152, 154, 156 and 158 as a function of a control input on line 160. This control input is a variable that can change between first and second values to control the amount of digital audio and analog audio to be used to produce the output signal. For example the control input variable can vary between zero and one, where one indicates all digital, zero indicates all analog, and a value between zero and one indicates the appropriate mix of analog and digital. The method of this invention can be achieved through modifications in the digital audio path prior to the analog/digital blend mixing, and are illustrated in blocks 162, 164, 166 and 168 in FIG. 4. These functions are the "stereo/mono blend" 162 with its associated "stereo separation control" function 164, and the "variable bandwidth LPF" 166 with its associated "audio bandwidth control" 168. The receiver digital signal processor/demodulator 170 produces analog audio samples 172 and digital audio samples 174 as shown in FIG. 3. Digital audio packet errors are detected as shown in block 176. The detection of digital packet errors is used to control the stereo separation control 164, audio bandwidth control 168 and analog/digital blend control 178. Either the stereo separation or bandwidth control can be adjusted separately, but maximum benefit may be obtained by adjusting them together.

Figure 5:
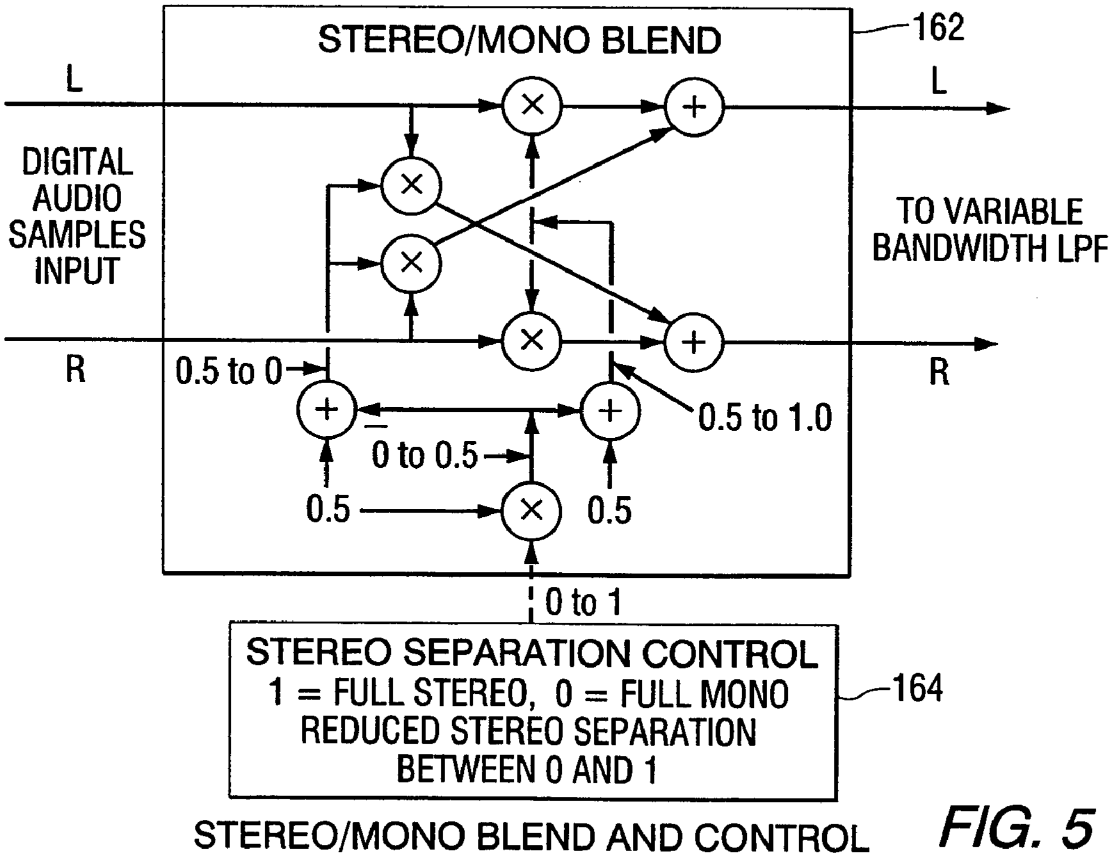
FIG. 5 is a functional diagram for stereo/mono blending and stereo separation control.

The stereo/mono blend is comprised of a matrix mixing of its left (L) and right (R) audio inputs. FIG. 5 shows a functional diagram of this stereo/mono blend and its control. This stereo separation control 164 produces a stereo separation control variable (SSCV) that can change between first and second values to control the amount of stereo separation in the digital audio signal. For example the SSCV can vary between zero and one, where one indicates full stereo, zero indicates full mono, and a value between zero and one indicates reduced stereo separation.

Figure 6:
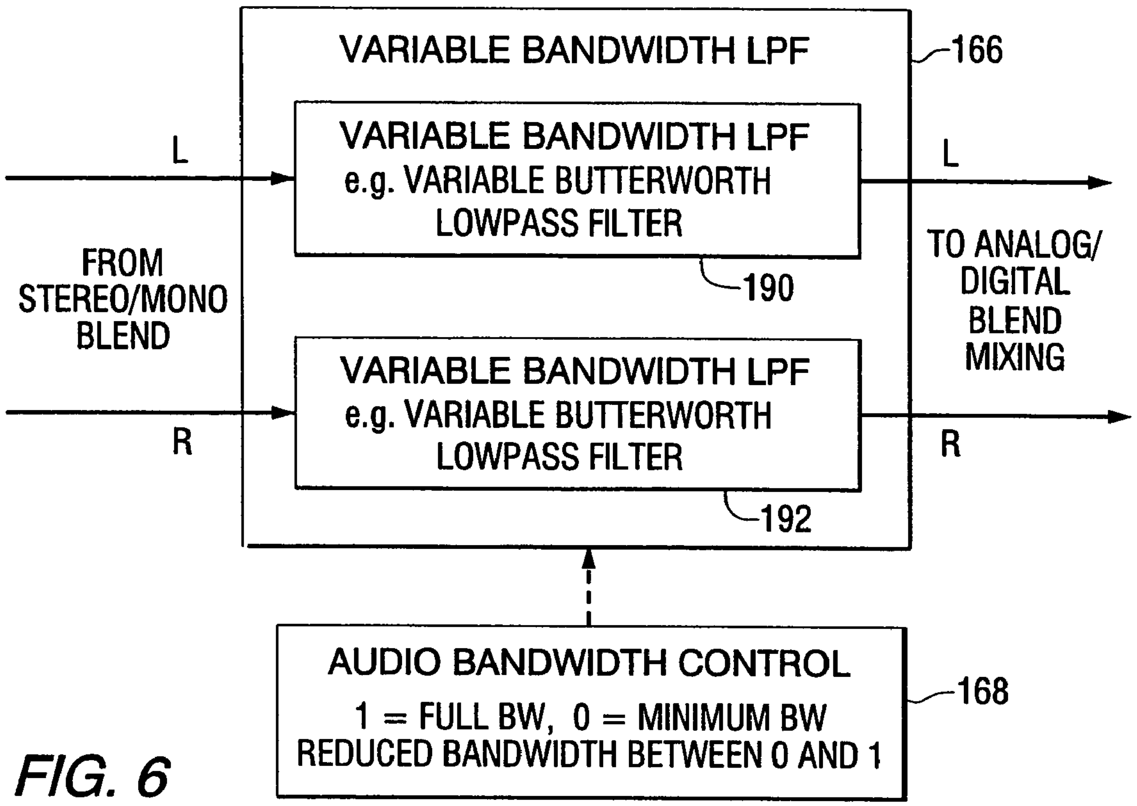
FIG. 6 is a functional diagram for variable bandwidth low pass filter (LPF) and audio bandwidth control.

FIG. 6 shows a functional diagram for variable bandwidth low pass filter (LPF) 166 and its associated audio bandwidth control 168. This audio bandwidth control 168 produces an audio bandwidth control variable (ABCV) that can change between first and second values to control the bandwidth of the left and right digital audio signals. For example the ABCV can vary between zero and one, where one indicates full bandwidth, zero indicates minimum bandwidth, and a value between zero and one indicates reduced bandwidth.

A digital fourth-order Butterworth filter 190 with a continuously variable bandwidth control can be used as an appropriate low pass filter (LPF) filter. This filter can be designed with an input control parameter such that the bandwidth is a function of the control variable. The bandwidth can be varied from minimum (e.g. 5 kHz for AM, 10 kHz for FM) when the control input is zero, to maximum bandwidth (e.g. 15 kHz for AM, 20 kHz for FM) when the control input is one. The bandwidth is between the minimum and maximum when the control input is varied between zero and one. A second filter 192 is used for stereo.

The design of the digital Butterworth filter can be derived from a standard analog version of the filter whose S-domain transfer function H(s) is defined as:

$$H(s) = \frac{(2\cdot\pi\cdot f_c)^N}{\prod_{n=0}^{N-1}\left[s - 2\cdot\pi\cdot f_c\cdot \exp\left\{j\cdot\pi\cdot\left(\frac{2\cdot n+1+N}{2\cdot N}\right)\right\}\right]}$$

Where $f_c$ is the desired one-sided filter bandwidth, N is the order of the filter, and n is the $n^{th}$ filter pole of N total poles. A convenient expression for a fourth-order filter of this type is:

$$H(s, fc) = \frac{(2\cdot\pi\cdot f_c)^4}{\left(s^2 - s\cdot 4\cdot\pi\cdot f_c\cdot\cos\left(\pi\cdot\frac{5}{8}\right) + 4\cdot\pi^2\cdot f_c^2\right)\cdot\left(s^2 - s\cdot 4\cdot\pi\cdot f_c\cdot\cos\left(\pi\cdot\frac{7}{8}\right) + 4\cdot\pi^2\cdot f_c^2\right)}$$

Figure 7:
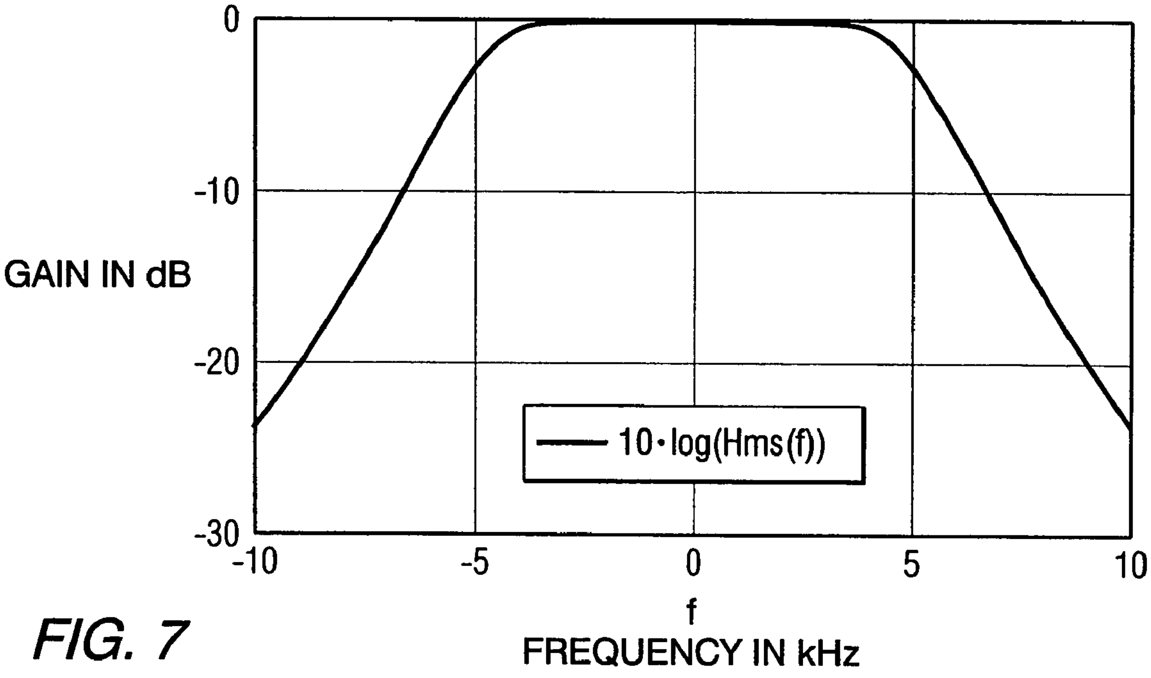
FIG. 7 is a plot of a typical Butterworth filter magnitude response.

A plot of the filter magnitude response for a fourth-order filter (N=4) with a bandwidth of 5 kHz is shown in FIG. 7.

The analog Butterworth filter can be converted into a digital Butterworth using conventional digital filter design techniques by replacing the analog "s" using the digital bilinear transform, and choosing and appropriate sample rate (or its reciprocal T).

$$s = \frac{2}{T}\cdot\frac{1-z^{-1}}{1+z^{-1}};\ T = \frac{1}{44100}$$

The transfer function for the digital fourth-order Butterworth filter then becomes:

$$H(z, fc) = \frac{(2\cdot\pi\cdot f_c\cdot T)^4}{\left(\left(2\cdot\frac{1-z^{-1}}{1+z^{-1}}\right)^2 - 2\cdot\frac{1-z^{-1}}{1+z^{-1}}\cdot 4\cdot\pi\cdot f_c\cdot T\cdot\cos\left(\pi\cdot\frac{5}{8}\right) + 4\cdot\pi^2\cdot f_c^2\cdot T^2\right)\cdot\left(\left(2\cdot\frac{1-z^{-1}}{1+z^{-1}}\right)^2 - 2\cdot\frac{1-z^{-1}}{1+z^{-1}}\cdot 4\cdot\pi\cdot f_c\cdot T\cdot\cos\left(\pi\cdot\frac{7}{8}\right) + 4\cdot\pi^2\cdot f_c^2\cdot T^2\right)}$$

Although the above transfer function $H(z,f_c)$ is clearly a function of the filter bandwidth $f_c$, it is more computationally efficient to generalize this digital transfer function into a function of v (instead of $f_c$), for ease of computation. The coefficients become functions of a new filter bandwidth control variable, v in this case. The goal here is to provide v as a function of $f_c$ where v varies from zero to one as the desired filter bandwidth varies from minimum to maximum. Solving a set of equations and unknowns yields the more convenient expression for the digital filter:

$$H(z, v) = \frac{(z+1)^4}{(z^2\cdot A(v) + z\cdot B(v) + C(v))\cdot(z^2\cdot D(v) + z\cdot B(v) + E(v))}$$

The coefficients are now a function of v.

$$A(v)=v^2+0.765369\cdot v+1$$

$$B(v)=2-2\cdot v^2$$

$$C(v)=v^2-0.765369\cdot v+1$$

$$D(v)=v^2+1.84776\cdot v+1$$

$$E(v)=v^2-1.84776\cdot v+1$$

And v is then defined as a function of a new bandwidth control variable BW, where BW can be varied between zero and one to control minimum to maximum filter bandwidth. A convenient function for BW as a function of v is:

$$v=2.5-2\cdot BW$$

Figure 8:
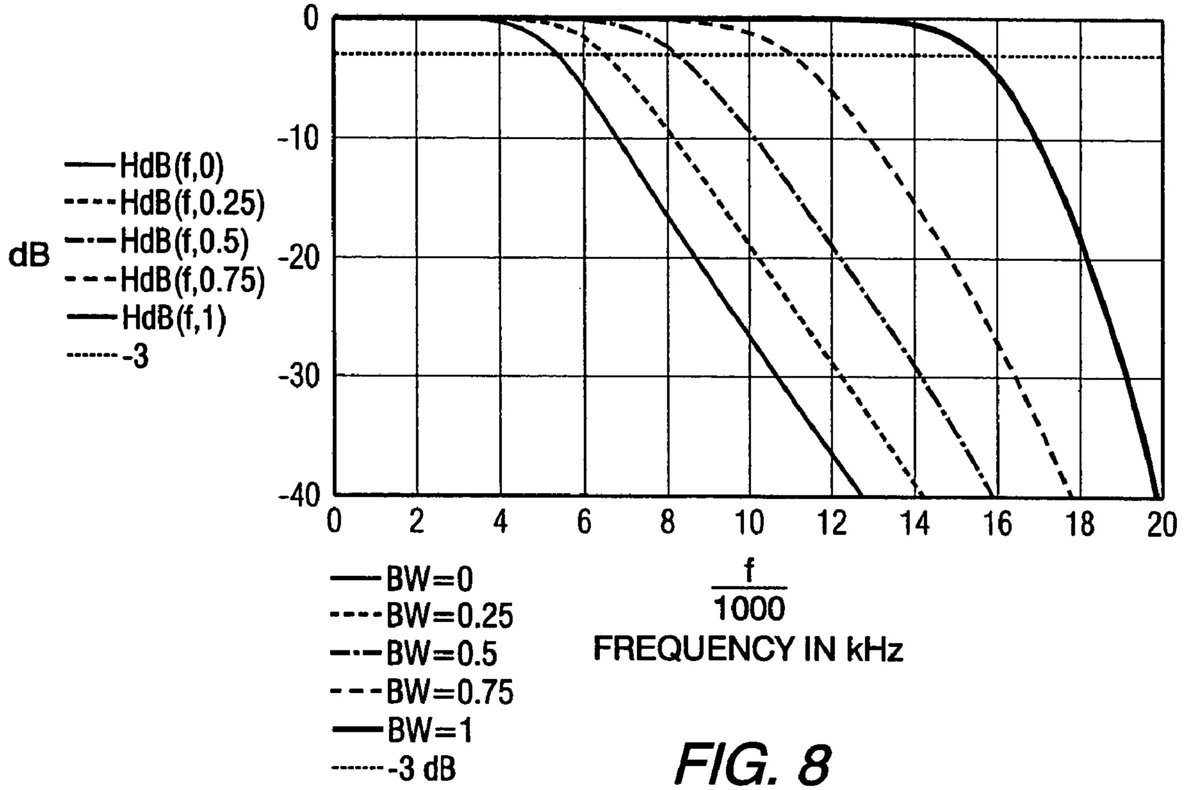
FIG. 8 is a filter transfer function showing how the bandwidth varies as a function of a bandwidth blend factor BW.

FIG. 8 shows the effect(s) of different values of BW on the one-sided filter bandwidth. It should be straightforward to understand now how the filter bandwidth can be controlled.

The method of this embodiment controls the stereo separation and audio bandwidth in the digital audio signal as a function of blend occurrences due to digital outages. The goal is to smooth the blend transitions when blending from analog audio to digital audio, and digital audio to analog audio.

Present state-of-the-art compression techniques convert a sampled audio stream, sampled at 44.1 kHz, for example, into grouped audio frames including 2048 stereo audio samples (for example, at the transmitter encoding side). Each of these (input) audio frames would include 65,536 bits (2048, 16-bit stereo samples) at a bit rate of about 1.5 Mbps if not compressed. Compression into fewer bits to represent this audio is needed to efficiently communicate the audio over bandlimited media, such as digital radio. These audio frames are compressed into variable length packets that are much smaller (for example, 100 to 4000 bits) with compression ratios between 15 and 75 resulting in compressed audio transmitted rates of 96 kbps down to 20 kbps, depending upon the application. Each audio frame carries about 46 milliseconds of audio, regardless of the compression ratio. These compressed audio frames are received and decoded to reconstruct the original audio signal at the receiver output.

Each received audio frame carries some overhead for proper framing, along with FEC and error detection. An error detected in an audio frame would generally render that 46-millisecond audio segment useless. However techniques exist to conceal the effects of isolated packet errors such that these errors are often imperceptible. Outages over several audio frames would be noticeable since the digital audio output would be degraded and muted. For these larger outages, the time-diverse analog audio is substituted for the digital signal.

Instead of abruptly switching from digital-to-analog, or analog-to-digital, the blend function smoothly attenuates the outgoing audio while bringing the incoming audio to full level using a ramp function. This ramp function is presently limited to about one second due to the diversity delay and decoding times. This one-second of blend transition time may be too short, due to the difference in audio quality between the digital and analog audio, where the digital signal is generally assumed to be stereo with high bandwidth (e.g. 12 to 20 kHz), while the analog audio in AM is monophonic and limited to 5 kHz. In the areas of coverage where digital outages occur, the FM analog audio signal is generally monophonic and limited to roughly 8 to 10 kHz due to receiver noise mitigation techniques in the fringe coverage areas. However this is still better than a digital outage where the digital audio is either present, or not, and the outages can become intermittent and frequent.

The short blend transition can be perceived as annoying when the audio quality is changing within a second, and can be particularly annoying in the AM case, especially when the blends occur frequently, (e.g., tens of seconds apart, or more frequently). The perfect blend solution is elusive because it involves using an analog backup audio signal of a different quality, and assessing the efficacy of the perceived improvements is subjective. However, this invention addresses the particularly annoying short and frequent blend transition times commonly recognized by listeners. These transitions can be accommodated with some adjustable parameters to maximize perceived audio quality.

A digital signal is assumed to be corrupted when an error is detected in an audio frame; however, a single corrupted audio frame can be concealed without any blending. When errors are detected on a plurality of (that is, several or more) audio frames within a predetermined time interval, a blend-to-analog transition is initiated. A "digital available" signal (this signal is labeled "D" for convenience) is created by the error detection function for each audio frame (46 milliseconds). This D signal is a logic "one" when no error is detected, and a logic "zero" in the event of an error. A blend control signal (labeled "B") assumes a value of 1 when the audio output is full digital, and zero when the audio output is full analog. Values of B between 0 and 1 control the relative weighting of analog and digital audio. The D signal is provided roughly one second in advance of the audio output so that the transition to analog can be blended smoothly over that second. This one-second is less than the actual diversity delay due to the time consumed by the digital decoding, and the fact that more than one error is needed to start the blend (since single errors are concealed).

In the simplest example, the D signal (with an appropriate delay) can be used to directly control the selection of the analog or digital audio output. In theory, this could provide the maximum possible digital output time since the digital output is always selected when available. However the blend transitions to the analog backup signal are virtually instantaneous and would sound annoying due to the relative audio quality step changes.

The step changes can be smoothed by creating the intermediate blend signal "B". B normally has a value of 1 when the digital signal is continuously present. When more than one digital frame error is detected (D is zero for more than one digital audio frame), then a ramp function from 1 to 0 is initiated for the B signal over the one second interval before the digital audio is unavailable. This can be adjustable for each receiver manufacturer for their best subjective audio quality. For example, the ramp function can be initiated after 2 consecutive errors, or if 4 error non-consecutive occur over the past 16 audio frames. Longer time spans (for example, several seconds to tens of seconds, or tens to hundreds of audio frames) with a different function of error patterns or error density may be used in more complex implementations. A filtered version of the D (the digital available parameter, or error indicator complement) signal may be used with thresholds to control the blending. This ramp signal B weights the digital output from 1 to 0, and weights the analog by its complement (1−B), such that the analog output is present when the digital audio is unavailable. Conversely, when the digital signal is uncorrupted (D=1) for a sufficient time span after digital is available (e.g. 1 second), then a ramp from 0 to 1 is initiated on the B signal so that the digital signal is at full value after that 1 second. It should be understood that, as used herein, the word "ramp" is not restricted to a linear ramp, but has the characteristic of an increasing or decreasing function depending upon the direction of the blend. The rates of the ramp may also be dependent upon the error characteristics.

It is important to recognize that the digital-to-analog (B=1 to 0) ramp is limited by the one second, or can be increased by increasing diversity delay or receiver delay time. However, the analog-to-digital transition time has more flexibility since both digital audio and the analog audio are available during this transition. In theory, it would be convenient if the receiver had long advance warning of digital errors so that the slow ramp from 1 to 0 of the B signal could be initiated say 10 seconds in advance. The slower the ramp transition time, the less annoying this becomes until it is barely perceptible, except that the analog quality is inferior. Also consider that listeners object to frequent blends over a short duration more than a single or fewer blends over that time period.

It is assumed that, during the occurrence of frequent blends, the blend transitions would be less annoying if the digital signal (stereo separation and bandwidth) were better matched to the analog signal, while the digital signal is also free of noise. Although it is impossible to predict the occurrence of frequent blends in advance, the presence of some blends over a short recent history may be useful in determining that the receiver is in a marginal coverage area. So when more than one blend event is detected over a short history, then it is likely useful to initiate a slow reduction in the stereo separation and bandwidth of the digital signal. Conversely, the stereo separation and bandwidth of the digital signal can be increased when the digital error history improves. Accordingly, two more blend functions can be created for the stereo separation and bandwidth control signals labeled BS and BW, respectively. The details for implementing the BS and BW controls should be somewhat intuitive, although subjective, and one approach is summarized next.

Figure 9:
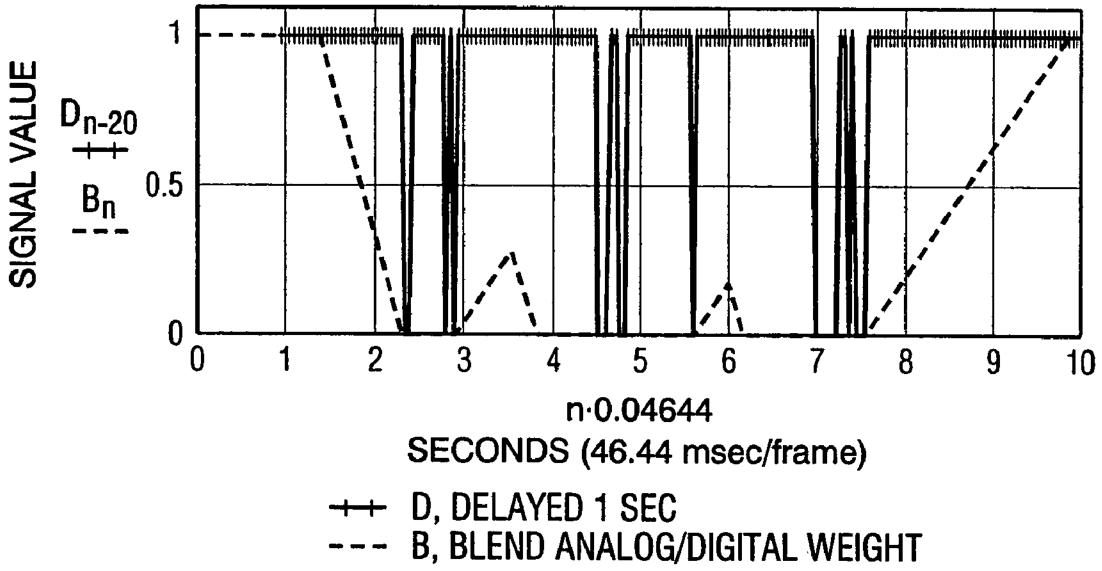
FIG. 9 is a plot showing an example of the effect of digital audio frame errors on an analog/digital blend value.

The analog/digital blend function described above is similar to that described in U.S. Pat. Nos. 6,178,317; 6,590,944; and 6,735,257, but is included here for example prior to the additional blend functions BS and BW. The analog/digital blend value D is generated as a function of digital audio frame errors, where D=1 for each good digital audio frame, and D=0 otherwise. Assuming the value of D is provided 20 audio frames in advance of the corresponding digital audio output, the value of B can initiate a ramp from 1 to 0 over the 20 frames (samples of D). If this ramp is reduced by 0.05=1/20 for each successive sample after an error is detected, then the value of B will reach 0 at the time digital audio is unavailable. When the digital audio becomes good (D=1), then the value of B can be ramped up, preferably with a slower ramp rate to smooth this transition. An example of this operation is plotted in FIG. 9, showing that the blend B yields the desirable effect. In this example, the decreasing ramp decrement value for B is 0.05, which is slower than the increasing ramp value of 0.02. This has the desirable effect of minimizing the transition rates. An example of a pseudocode implementation for B as a function of D is:

```
B := | "Generate analog/digital blend function"
     | N ← rows(D)
     | b ← 1
     | for n ∈ 0 ... N − 1 − 22
     |   | count ← 21 if D_n < 1
     |   | b ← | max(0, b − 0.05) if count < 0
     |   |     | min(1, b + 0.02) otherwise
     |   | count ← max(0, count − 1)
     |   | B_n ← b
     | B
```

Figure 10:
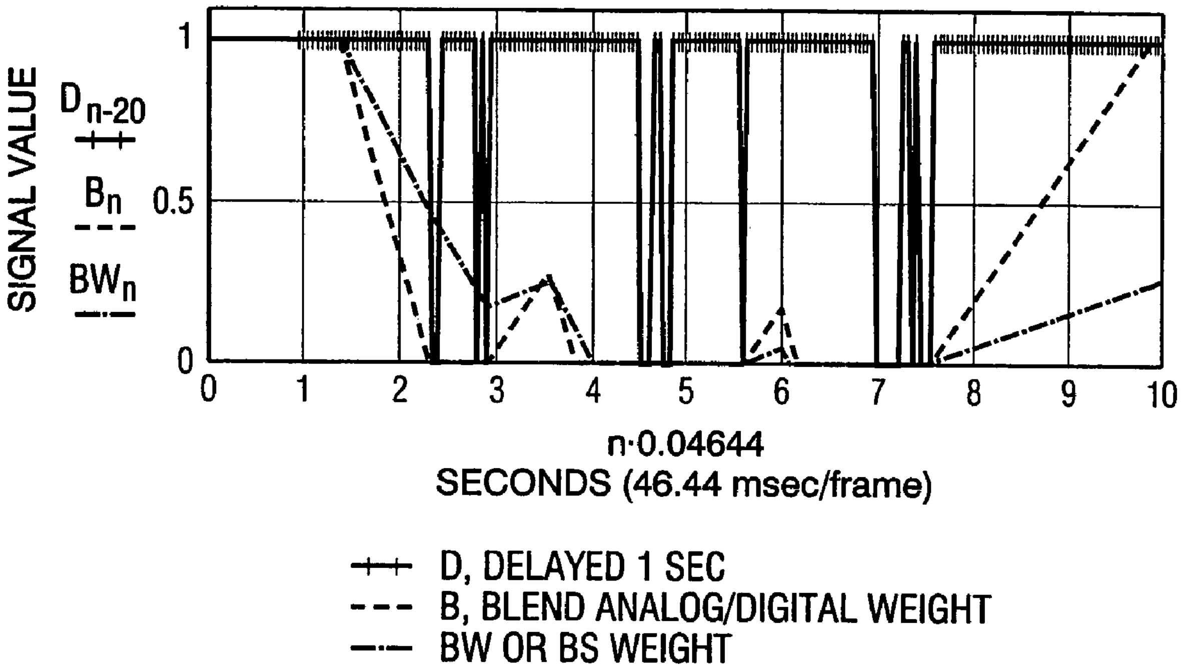
FIG. 10 is a plot showing another example of the effect of digital audio frame errors on an audio bandwidth blend value.

The stereo separation and audio bandwidth parameters BS and BW, respectively, can be generated in a similar manner to the analog/digital blend function B. The primary difference is in the ramp increment or decrement values for BS and BW, which should be slower. In fact parameters BS and BW can be the same function as each other, depending upon the subjective qualities and "annoyance factor" associated with the transition times for each. As an example, the decrement value can be halved, and the increment value can be reduced to ¼ of the analog/digital blend ramp rates relative to those for B. This example is plotted in FIG. 10 using the same scenario for D as in FIG. 9.

The purpose of slowing the ramp rates for BW and BS is to further smooth the transition time of the bandwidth and stereo separation. This has the desirable effect of reducing the annoying quick changes in bandwidth and stereo separation in the vicinity of the digital outages. One advantage of slowing the BS and BW ramp rates relative to the analog/digital ramp rates for B is that digital audio is maintained for a longer time span than the analog audio if the B ramp rates were slowed instead. Although the digital stereo separation and bandwidth in this case are reduced toward the similar analog audio characteristics, the digital audio is noise-free while the analog is likely to be noisy in these fringe coverage areas. Of course many variations of this operation are possible, such as changing the ramp rates, ramp shape function, or variable ramp functions adaptive to some characteristics of D, to subjectively optimize the overall listening experience.

The blend technique described above provides smooth audio blend transitions to make blends less annoying, and improve digital coverage by limiting digital audio bandwidth and stereo separation when frequent blends are occurring. This improves audio quality by smoothing transitions while maintaining more digital coverage instead of bias toward analog.

Additional blend features can also be implemented either separately or in combination with each other. For example, extending the signal buffering and transition to, for example, 3 seconds can implement a long transition between the digital and analog audio. This would require an increase in diversity delay and digital audio availability time by 2 seconds.

A selectable transition profile can be provided to imitate legacy perception. This can be implemented by setting the output to a monaural signal while emptying an output (depository for blending/source transition) buffer. In addition, or alternatively, noise can be added to the output while emptying the output buffer so that the output sounds closer to an impaired analog AM output.

Also, the digital output level can be attenuated, or even silenced, while emptying the output buffer or the output can be silence after emptying the output buffer. This would allow the receiver to define any analog ramp up duration, independent of the receiver buffer.

The 'audio blend indicator' can be delayed for about 1 second while affecting (attenuating, silencing, etc.) the output from the buffer and silence/noise can be output once the buffer is empty. This will extend the transition with a degraded output, without affecting the digital audio, yet allows the receiver to select transition (ramping up the analog audio) time independently.

Alternatively a selectable transition profile can be implemented using a new transition paradigm, such as by producing an audible sound to indicate a transition, instead of blending.

A Signal Quality Measure (SQM) output and/or Digital Audio Availability Indication (DAAI) can be added to provide a general visual indication of the digital signal quality. This would associate audio quality with visual indicator on the receiver.

Blending of the digital audio signal and the analog audio signal can be achieved by either simultaneous processing of the two signals or by subsequent processing. That is, it is possible to blend by fading out one signal while fading in the other, or by fading one signal by attenuation/silencing and only then indicating (by using the blending indicator) that it's time to fade in the other signal.

Figure 11:
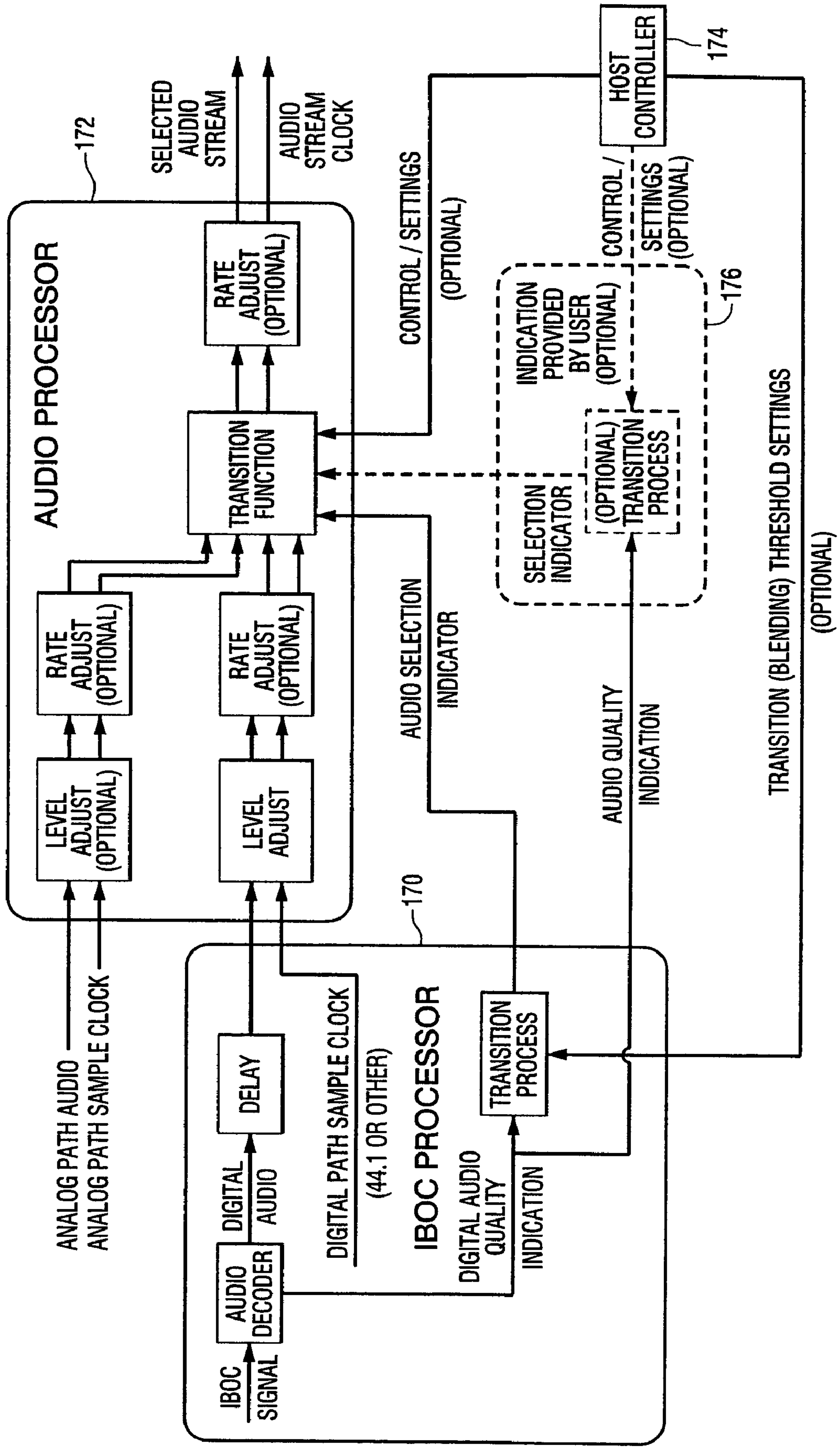
FIG. 11 is a block diagram of a blend mechanism that can provide blending in accordance with this invention.

FIG. 11 is a block diagram of a blend mechanism that can provide blending in accordance with this invention. Block 170 illustrates the processing of the digital portion of the signal, and block 172 illustrates the blending of the analog audio and digital audio portions of the signal. A host controller can be used to provide optional control signals to the IBOC processor and the audio processor, and to an optional selection indicator 176 that would respond to an audio quality indication.

While the present invention has been described in terms of its preferred embodiments, it will be apparent to those skilled in the art that various modifications can be made to the described embodiments without departing from the scope of the invention as defined by the following claims.

What is claimed is:

1. A method for processing a composite digital audio broadcast signal to mitigate intermittent interruptions in the reception of the digital audio broadcast signal, the method comprising the steps of:

separating an analog audio portion of the digital audio broadcast signal from a digital audio portion of the digital audio broadcast signal;

detecting errors in the digital audio portion of the digital audio broadcast signal;

adjusting stereo separation of the digital audio portion of the digital audio broadcast signal in response to errors in the digital audio portion of the digital audio broadcast signal to produce an adjusted digital audio portion; and blending the analog audio portion with the adjusted digital audio portion to produce an audio output.

2. The method of claim 1, wherein the step of adjusting stereo separation of the digital audio portion of the digital audio broadcast signal comprises the step of:

producing a stereo separation variable and controlling the stereo separation of the digital audio portion of the digital audio broadcast signal in response to the stereo separation variable.

3. The method of claim 2, wherein stereo separation variable varies according to a first ramp function having a first rate of change when blending in the analog audio portion and a second rate of change when blending out the analog audio portion.

4. A method for processing a composite digital audio broadcast signal to mitigate intermittent interruptions in the reception of the digital audio broadcast signal, the method comprising the steps of:

separating an analog audio portion of the digital audio broadcast signal from a digital audio portion of the digital audio broadcast signal;

detecting errors in the digital audio portion of the digital audio broadcast signal;

adjusting either stereo separation or bandwidth or both of the digital audio portion of the digital audio broadcast signal in response to errors in the digital audio portion of the digital audio broadcast signal to produce an adjusted digital audio portion; and blending the analog audio portion with the adjusted digital audio portion to produce an audio output;

wherein the step of blending the analog audio portion with the adjusted digital audio portion to produce an audio output comprises the steps of:

producing a blend signal representative of a desired relative amount of the analog audio portion and the adjusted digital audio portion in the audio output;

ramping the blend signal magnitude in response to the frequency of errors detected in the digital audio portion; and controlling the relative amount of the analog audio portion and the adjusted digital audio portion in the audio output in response to the blend control signal.

5. The method of claim 4, wherein the ramp rise time for blending from the adjusted digital portion to the analog portion is less than the rise time for blending from the analog portion to the adjusted digital portion.

6. A method for processing a composite digital audio broadcast signal to mitigate intermittent interruptions in the reception of the digital audio broadcast signal, the method comprising the steps of:

separating an analog audio portion of the digital audio broadcast signal from a digital audio portion of the digital audio broadcast signal;

detecting errors in the digital audio portion of the digital audio broadcast signal;

adjusting either stereo separation or bandwidth or both of the digital audio portion of the digital audio broadcast signal in response to errors in the digital audio portion of the digital audio broadcast signal to produce an adjusted digital audio portion; and blending the analog audio portion with the adjusted digital audio portion to produce an audio output;

wherein the step of detecting errors in the digital audio portion of the digital audio broadcast signal comprises the step of detecting errors in audio frames of the digital audio portion of the digital audio broadcast signal, and the step of blending the analog audio portion with the adjusted digital audio portion to produce an audio output is initiated after errors are detected in a plurality of audio frames of the digital audio portion of the digital audio broadcast signal within a predetermined time interval.

7. A method for processing a composite digital audio broadcast signal to mitigate intermittent interruptions in the reception of the digital audio broadcast signal, the method comprising the steps of:

separating an analog audio portion of the digital audio broadcast signal from a digital audio portion of the digital audio broadcast signal;

detecting errors in the digital audio portion of the digital audio broadcast signal;

adjusting the digital audio portion of the digital audio broadcast signal in response to errors in the digital audio portion of the digital audio broadcast signal to produce an adjusted digital audio portion; and blending the analog audio portion with the adjusted digital audio portion to produce an audio output, wherein the step of adjusting the digital audio portion of the digital audio broadcast signal comprises adding noise to the digital audio portion.

8. The method of claim 7, wherein the step of blending the analog audio portion with the adjusted digital audio portion to produce an audio output is performed by either: simultaneous processing of the analog audio portion with the adjusted digital audio portion; or by fading out one of the analog audio portion or the adjusted digital audio portion and then indicating that it is time to fade in the other one of the analog audio portion or the adjusted digital audio portion.

9. The method of claim 7, further comprising the step of:

producing an audible and/or visible indication of degradation in the digital audio portion of the digital audio broadcast signal.

10. A radio receiver comprising:

an input for receiving a composite digital audio broadcast signal including an analog audio portion and a digital audio portion;

a filter for separating the analog audio portion of the digital audio broadcast signal from the digital audio portion of the digital audio broadcast signal; and a processor for detecting errors in the digital audio portion of the digital audio broadcast signal, adjusting stereo separation of the digital audio portion of the digital audio broadcast signal in response to errors in the digital audio portion of the digital audio broadcast signal to produce an adjusted digital audio portion, and blending the analog audio portion with the adjusted digital audio portion to produce an audio output.

11. The radio receiver of claim 10, wherein the processor produces a stereo separation variable and controls the stereo separation of the digital audio portion of the digital audio broadcast signal in response to the stereo separation variable.

12. The radio receiver of claim 11, wherein stereo separation variable varies according to a first ramp function having a first slope when blending in the analog audio portion and a second slope when blending out the analog audio portion.

13. A radio receiver comprising:

an input for receiving a composite digital audio broadcast signal including an analog audio portion and a digital audio portion;

a filter for separating the analog audio portion of the digital audio broadcast signal from the digital audio portion of the digital audio broadcast signal; and a processor for detecting errors in the digital audio portion of the digital audio broadcast signal, adjusting either stereo separation or bandwidth or both of the digital audio portion of the digital audio broadcast signal in response to errors in the digital audio portion of the digital audio broadcast signal to produce an adjusted digital audio portion, and blending the analog audio portion with the adjusted digital audio portion to produce an audio output;

wherein the processor produces a blend signal representative of a desired relative amount of the analog audio portion and the adjusted digital audio portion in the audio output, ramps the blend signal magnitude in response to the frequency of errors detected in the digital audio portion; and controls the relative amount of the analog audio portion and the adjusted digital audio portion in the audio output in response to the blend control signal.

14. The radio receiver of claim 13, wherein the ramp rise time for blending from the adjusted digital portion to the analog portion is less than the rise time for blending from the analog portion to the adjusted digital portion.

15. A radio receiver comprising:

an input for receiving a composite digital audio broadcast signal including an analog audio portion and a digital audio portion;

a filter for separating the analog audio portion of the digital audio broadcast signal from the digital audio portion of the digital audio broadcast signal; and a processor for detecting errors in the digital audio portion of the digital audio broadcast signal, adjusting either stereo separation or bandwidth or both of the digital audio portion of the digital audio broadcast signal in response to errors in the digital audio portion of the digital audio broadcast signal to produce an adjusted digital audio portion, and blending the analog audio portion with the adjusted digital audio portion to produce an audio output;

wherein the processor detects errors in audio frames of the digital audio portion of the digital audio broadcast signal, and initiates blending of the analog audio portion with the adjusted digital audio portion to produce an audio output after errors are detected in a plurality of audio frames of the digital audio portion of the digital audio broadcast signal within a predetermined time interval.

16. A radio receiver comprising:

an input for receiving a composite digital audio broadcast signal including an analog audio portion and a digital audio portion;

a filter for separating the analog audio portion of the digital audio broadcast signal from the digital audio portion of the digital audio broadcast signal; and a processor for detecting errors in the digital audio portion of the digital audio broadcast signal, for adjusting the digital audio portion of the digital audio broadcast signal in response to errors in the digital audio portion of the digital audio broadcast signal to produce an adjusted digital audio portion, and for blending the analog audio portion with the adjusted digital audio portion to produce an audio output, wherein the processor adds noise to the digital audio portion.

17. The radio receiver of claim 16, wherein the processor produces an audible and/or visible indication of degradation in the digital audio portion of the digital audio broadcast signal.

18. The method of claim 1, further comprising:

adjusting bandwidth of the digital audio portion of the digital audio broadcast signal in response to errors in the digital audio portion of the digital audio broadcast signal to produce the adjusted digital audio portion.

19. The method of claim 18, further comprising:

producing a stereo separation variable and controlling the stereo separation of the digital audio portion of the digital audio broadcast signal in response to the stereo separation variable; and producing a bandwidth control variable and controlling the bandwidth of the digital audio portion of the digital audio broadcast signal in response to the bandwidth control variable.

20. The method of claim 19, wherein stereo separation variable varies according to a first ramp function having a first rate of change when blending in the analog audio portion and a second rate of change when blending out the analog audio portion, and wherein bandwidth control variable varies according to a second ramp function having a first rate of change when blending in the analog audio portion and a second rate of change when blending out the analog audio portion.

21. The radio receiver of claim 10, wherein the processor adjusts bandwidth of the digital audio portion of the digital audio broadcast signal in response to errors in the digital audio portion of the digital audio broadcast signal to produce the adjusted digital audio portion.

22. The radio receiver of claim 21, wherein the processor produces a stereo separation variable and controls the stereo separation of the digital audio portion of the digital audio broadcast signal in response to the stereo separation variable, and produces a bandwidth control variable and controls the bandwidth of the digital audio portion of the digital audio broadcast signal in response to the bandwidth control variable.

23. The radio receiver of claim 22, wherein stereo separation variable varies according to a first ramp function having a first rate of change when blending in the analog audio portion and a second rate of change when blending out the analog audio portion, and wherein bandwidth control variable varies according to a second ramp function having a first rate of change when blending in the analog audio portion and a second rate of change when blending out the analog audio portion.

24. The method of claim 1, wherein the step of adjusting stereo separation of the digital audio portion of the digital audio broadcast signal blends the digital audio portion to monaural.

25. The method of claim 1, wherein the step of blending the analog audio portion with the adjusted digital audio portion to produce an audio output further comprises the step of:

attenuating the adjusted digital audio portion.

26. The method of claim 25, wherein the adjusted digital audio portion is attenuated to silence.

27. The method of claim 7, wherein the step of adjusting the digital audio portion of the digital audio broadcast signal blends the digital audio portion to monaural.

28. The method of claim 7, wherein the step of blending the analog audio portion with the adjusted digital audio portion to produce an audio output further comprises the step of:

attenuating the adjusted digital audio portion.

29. The method of claim 28, wherein the adjusted digital audio portion is attenuated to silence.

* * * * *

UNITED STATES PATENT AND TRADEMARK OFFICE

CERTIFICATE OF CORRECTION

PATENT NO. : 7,546,088 B2
APPLICATION NO. : 10/898829
DATED : June 9, 2009
INVENTOR(S) : Brian W. Kroeger and Marek Milbar It is certified that error appears in the above-identified patent and that said Letters Patent is hereby corrected as shown below:

Column 12, Line 45
max(0,b-0.05) if count “< 0” should read max(0,b-0.05) if count “> 0”

Signed and Sealed this

First Day of December, 2009

David J. Kappos

David J. Kappos
*Director of the United States Patent and Trademark Office*